United States Patent

Tsukada et al.

[11] Patent Number: 6,069,974
[45] Date of Patent: May 30, 2000

[54] IMAGE PROCESSOR

[75] Inventors: Koji Tsukada, Toyokawa; Kaoru Tada, Aichi-Ken, both of Japan

[73] Assignee: Minolta Co., Ltd., Osaka, Japan

[21] Appl. No.: 09/004,794

[22] Filed: Jan. 9, 1998

Related U.S. Application Data

[62] Division of application No. 08/358,834, Dec. 19, 1994, Pat. No. 5,831,748.

[51] Int. Cl.⁷ .................................................. G06K 9/00
[52] U.S. Cl. .................................................. 382/170
[58] Field of Search .................................. 382/170, 171; 358/462

[56] References Cited

U.S. PATENT DOCUMENTS

| | | | |
|---|---|---|---|
| 4,411,015 | 10/1983 | Scherl et al. | 382/171 |
| 4,504,972 | 3/1985 | Scherl et al. | 382/171 |
| 4,679,074 | 7/1987 | Sugiura et al. | 358/80 |
| 4,763,190 | 8/1988 | Froelich | 358/79 |
| 4,837,450 | 6/1989 | Satomura et al. | 250/571 |
| 5,046,118 | 9/1991 | Ajewole et al. | 382/168 |
| 5,410,418 | 4/1995 | Yonezawa | 358/458 |

FOREIGN PATENT DOCUMENTS

4-37258  2/1992  Japan .

*Primary Examiner*—Phuoc Tran
*Attorney, Agent, or Firm*—Sidley & Austin

[57] ABSTRACT

In a digital copying machine, a ground in a document image is removed according to the type of document by referring to a histogram of reflectance data on a document image prepared for each line. A ground peak or a gradation level having the largest frequency in the histogram is determined. Further, frequencies are obtained in three windows appropriate for extracting characteristic quantities for ground, background and characters. A window for the ground quantity is determined according to the ground peak, and a ground range for removing the ground is determined by using the ground peak and the three frequencies. Then, the gradation data are corrected according to the ground range, and an image is formed on a sheet of paper according to the corrected gradation data. Thus, a ground can be removed by analyzing the histogram without a prescan.

7 Claims, 11 Drawing Sheets

IMAGE PROCESSOR

RELATED APPLICATION

This is a division of application Ser. No. 08/358,834, filed Dec. 19, 1994, and now U.S. Pat. No. 5,831,748.

FIELD OF THE INVENTION

The present invention relates to a digital image processor for a digital copying machine or the like, especially to processing of ground and background of a document image.

BACKGROUND OF THE INVENTION

In an analog electrophotographic copying machine or the like, a quantity of exposure light is controlled automatically by monitoring an average density of a document image. Thus, a ground of a document image can be removed by changing the quantity of exposure light. A ground means an area, such as a white base area in a white paper, wherein no information is recorded. This automatic exposure control has an advantage that it can be performed at a high speed. It is also advantageous that the automatic exposure can be controlled rather uniformly when it is repeated on the same document.

On the other hand, in a digital electrophotographic copying machine or the like, a document image is first read as digital data and the digital data is printed. In such a digital copying machine, various data processing is possible if prescan data are available. Then, characteristics of a reproduced image can be controlled or changed by using data processing on the prescan data. For example, it is possible to discriminate a type of document such as a half-tone document including a photograph or the like or a character document including only characters and to correct the digital data according to the type of document, for example with smoothing or edge emphasis.

One of the data processing methods includes removing a ground of a document image by setting an appropriate ground range which includes the density level of the ground. Then, the image density can be corrected for example by removing the data in the ground range. The ground range can be determined, for example, by analyzing a shape of an entire histogram of image data or by using a level having a maximum frequency in the histogram. Then, the ground can be corrected appropriately by analyzing image data.

However, such digital data processing has disadvantages if compared with an analog copying machine. For example, a high speed processing is difficult due to data processing by a software program. It is also disadvantageous that prescan data are needed.

SUMMARY OF THE INVENTION

An object of the present invention is to provide an image processor which can remove a ground from an image at a fast speed.

Another object of the present invention is to provide an image processor which can remove a ground from an image according to various kinds of documents.

In one aspect of the invention, a histogram is prepared by counting frequencies at each gradation level on the digital image data. Then, a gradation level having the largest frequency in the histogram is extracted as a ground reference value. Further, a feature of a document image useful for handling a ground and a background is extracted from the histogram. The ground means an area, such as a white base area in a white paper, wherein no information is recorded. The background means an area lying behind chief objects to be reproduced or a less important part of a document against the chief objects. Thus, a ground range is set according to the ground reference value by using a prescribed relation. Thus, image data are corrected by using the ground range and the feature. A histogram is prepared for each of a plurality of regions in a document, or more preferably for each line. Thus, the ground correction can be performed without prescan data of image data. Preferably if a change in a ground range for a line from that in a previous line exceeds a predetermined value, the difference is limited to the predetermined value. In order to extract features of a document, three windows for ground, background, and characters are provided in the histogram and frequencies are calculated for the three windows. It is a characteristic that background such as a color background on which characters are printed is taken into account besides the ground. For example, if a ratio of the frequency for the background to the frequency for the ground is small, the ground range is set smaller, while if the ratio is large, the ground range is set to be larger. Further, the offset range is set smaller with decreasing ground peak in order to prevent excess removal of data near the actual ground. Further, if a ratio of the frequency for the characters to a sum of the frequencies for the ground and the background is larger than a threshold value, the document is taken as a half-tone document, and the ground is not removed.

An advantage of the present invention is that the ground can be removed fast.

Another advantage of the present invention is that the ground can be removed according to a type of document.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
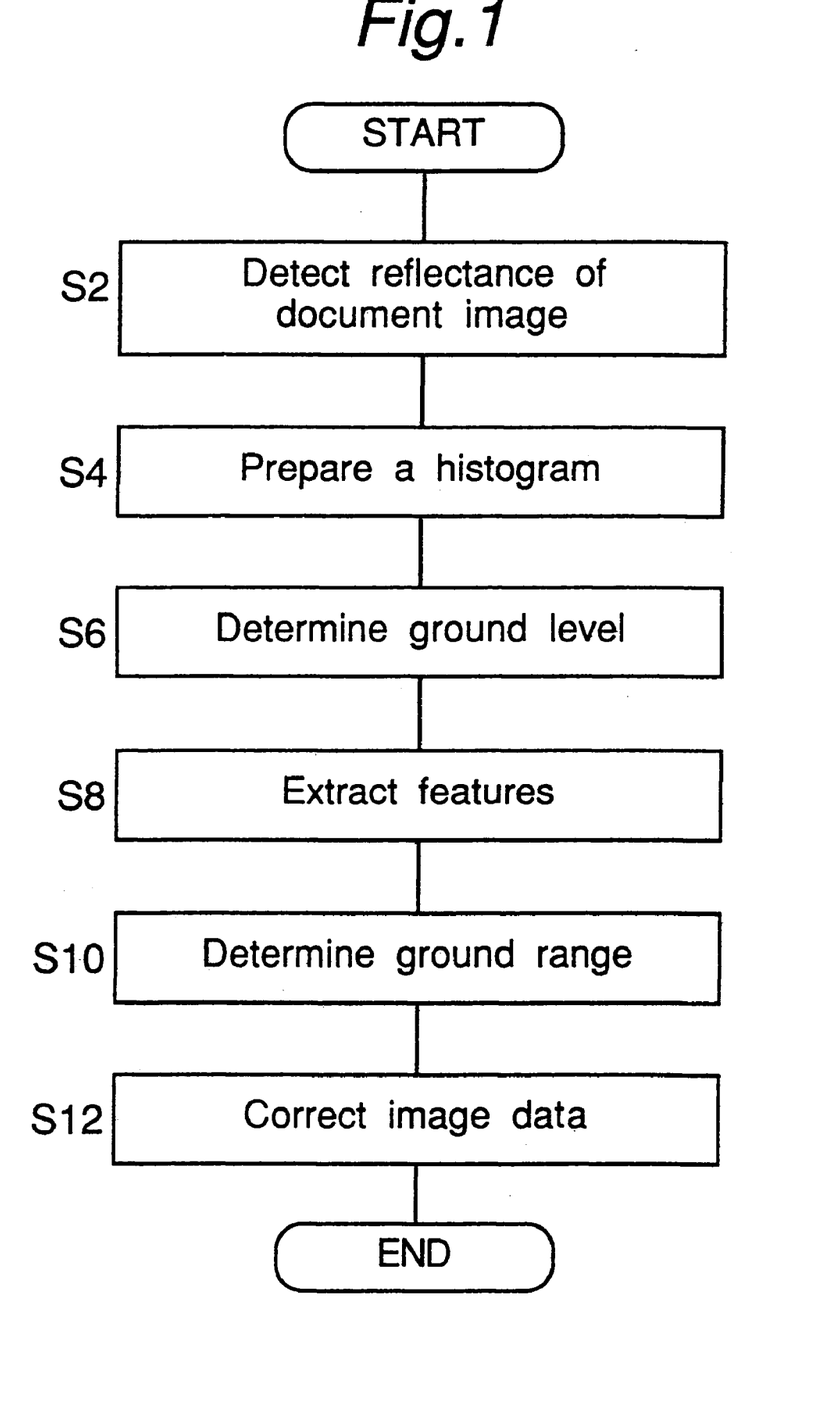
FIG. 1 is a flowchart of image processing on ground.
Figure 2:
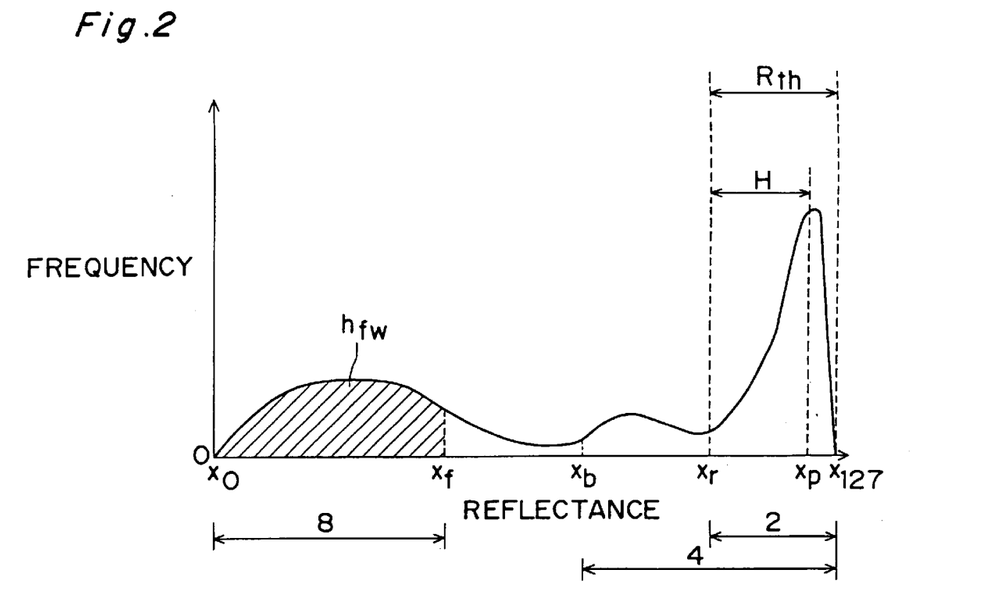
FIG. 2 is a histogram for illustrating a ground range and various quantities used to control the ground.

Referring now to the drawings, wherein like reference characters designate like or corresponding parts throughout the several views, embodiments of the invention are explained below. In an embodiment of the present invention, as shown in FIG. 1, a document is scanned, and a light reflected from a document image is detected with a sensor, such as a linear CCD sensor, and it is converted to digital data of say 256 gradation scale for each pixel (step S2). Then, a histogram of reflectance data of a line or the like is prepared (step S4) where, if necessary the gradation levels are grouped into 128 sections, each including, say two adjacent levels for removing spurious data distribution. The sections are also called levels herein. FIG. 2 shows an example of a histogram of a document where $x_o$ denotes black level and $X_{127}$ denotes white. A sharp peak due to a ground appears near the maximum level $X_{127}$, while a broad small peak due to characters (black image) appears at low reflectances near zero.

The ground of a document image is removed by using the histogram of reflectance data on a document. The ground means an area, such as a white base area in a white paper, wherein no information is recorded. First, a ground peak $x_p$, defined as a level having the largest frequency in the histogram, is determined in a range above a predetermined level $x_b$ where the ground is expected to exist (step S6). If there exists a plurality of levels having the same largest frequency, the one thereof having the smallest level or the smallest reflectance is selected because it is more appropriate for removing the ground. Further, quantities which represent features of a document image are extracted from the histogram (step S8). Then, a ground range 2, which is regarded as a range including the ground of the document image, is determined by using the ground peak $x_p$ and the features (step S8). Then, the data in the ground range 2 are corrected by using the ground range 2, as will be explained later (step S12).

In an example, in order to determine the ground range, an offset H, which represents an extension of the peak due to the ground below the peak $x_p$, is determined. Then, the lower limit $x_r$ of the ground range 2 is determined by subtracting the offset H from the ground peak $x_p$. That is, $$x_r = x_p - H.$$

Thus, the ground quantity $R_{th}$ in reflectance scale is determined as follows:

$$R_{th} = x_{127} - x_r = (x_{127} - x_p) + H.$$

The ground range or $R_{th}$ is determined according to the kind of document by analyzing the histogram. Before explaining the determination of the ground range, histograms of various types of document are explained.

FIGS. 3A–3E show examples of histograms of various types of documents. A histogram of reflectance data of a document image can be used to classify various types of documents. In a character or bi-level document shown in FIG. 3A, black characters are printed on a white paper or on a ground. A ground means an area, such as a white base area in a white paper, wherein no information is recorded. The ground of the document consists of a single peak at or near the white level while data on black characters are sparse and scatter widely at low levels in the histogram. Therefore, the ground can be removed easily at the white side, and the reproduction of characters is most important in image data processing. In a newspaper document shown in FIG. 3B, black characters are printed on a paper which is not so white. No peak appears near the white level, and a broad peak due to the ground exists far from the white level, that is, the peak of the ground is shifted to a much lower level than the white level. The frequency is distributed in a wide range below the peak in the histogram. Therefore, though the ground has to be removed, if it is removed excessively, characters in the document become narrow.

Figure 3A:
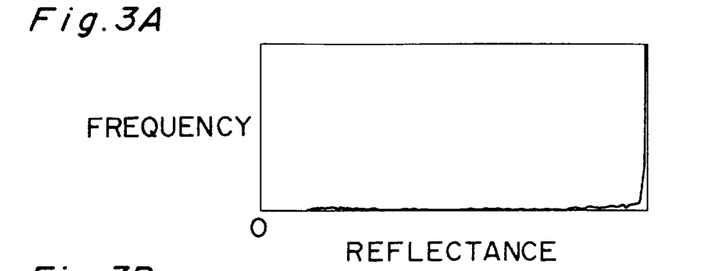
FIGS. 3A–3E are histograms of examples of various types of documents of a bi-level document, a newspaper document, a magazine document, a map document and a half-tone or photograph document.
Figure 3B:
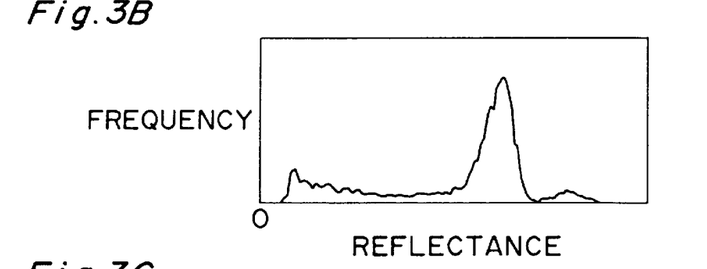
Figure 3C:
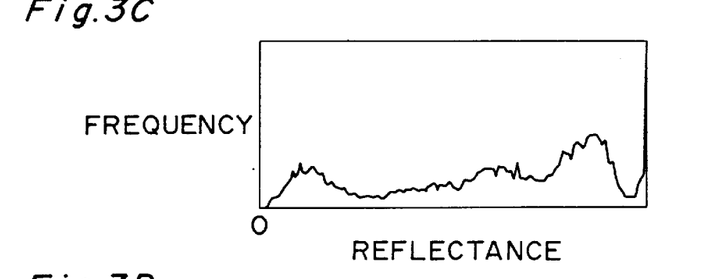
Figure 3D:
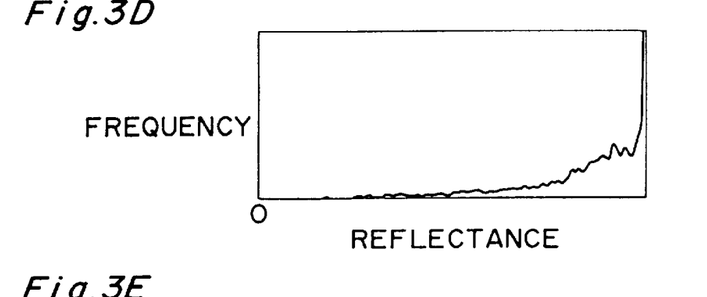
Figure 3E:
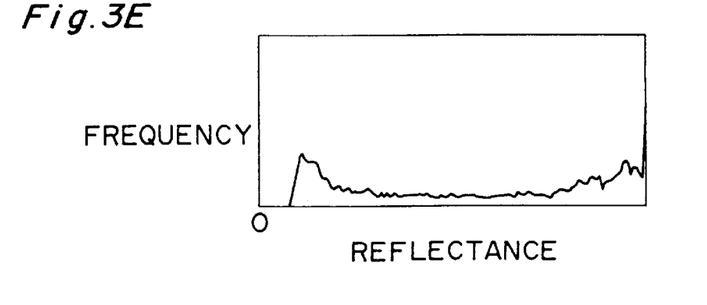

In a magazine document shown in FIG. 3C, characters are printed on a color background or a color paper. It is a feature of a magazine document that a background may be included. The color background is an example of a background which means an area lying behind chief objects to be reproduced or a less important part of a document against the chief objects. For example, backgrounds, such as the color background in a magazine document or color areas in a map document, express information relevant to the chief objects to be reproduced or set off the chief objects. The ground in the magazine document is large and distributed in a wide range in the histogram, but the frequency in the ground range near white is rather large if compared with the newspaper document. Characters printed on a color background are hard to be read if the ground is not removed. Therefore, the ground and the background have to be removed largely. Because the color is also an information to be reproduced, the background should not be removed completely. Thus, the newspaper document and the magazine document have to be handled according to the document type. A map document, shown in FIG. 3D, includes narrow color lines. The ground of the map document consists of a single peak of almost white, while color data scatter widely below the peak in the histogram. Then, in order to print narrow color lines the ground cannot be completely removed. In a half-tone document (a photograph of a woman's face) shown in FIG. 3E, the ground peak is not obvious, and the frequency distributes in the entire range in the histogram. Then, the ground should not be removed.

Figure 4:
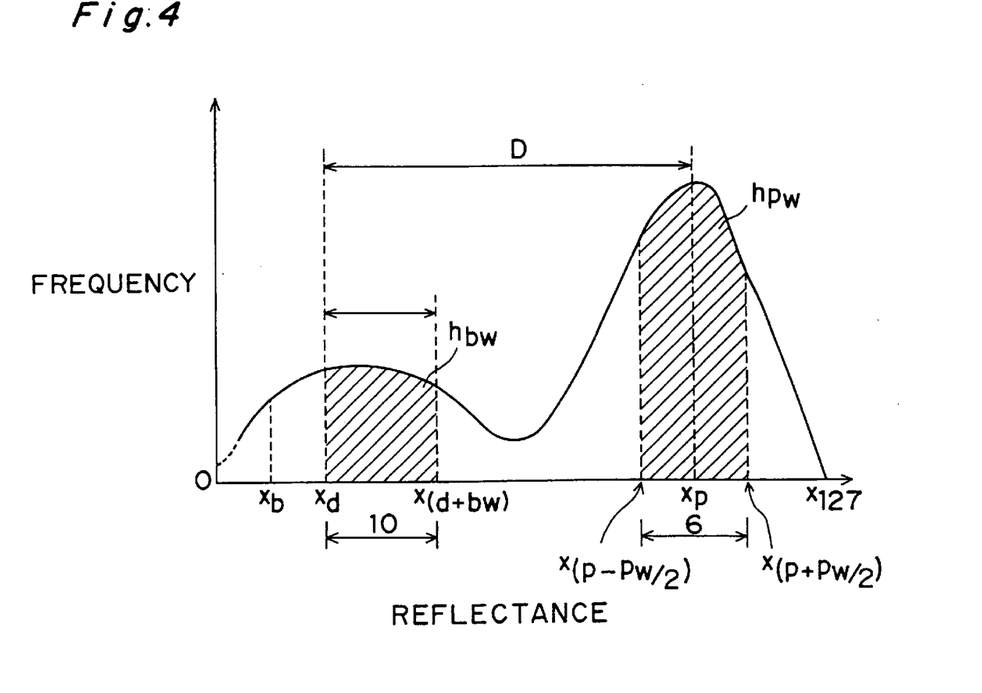
FIG. 4 is a histogram for illustrating various quantities used to control the ground.

Document types are classified by using three types of frequencies, that is, character frequency $h_{fw}$, background frequency $h_{bw}$ and ground frequency $h_{pw}$ obtained by analyzing a histogram of reflection data of a document image. The three frequencies are sums of frequencies in three ranges in the histogram explained below, and they are shown in FIGS. 2 and 4 as hatched areas. Further, two kinds of ratios, black-to-white ratio $R_{bw}$ and magazine ratio $R_{mg}$ are defined, and they are also used to classify a document type.

As shown in the example shown in FIG. 2 of reflectance of levels $x_o$ to $x_{127}$, a peak $x_p$ of frequency due to ground is observed near white and it is called as ground peak $x_p$. FIG. 2 illustrates a relation of the ground quantity to an example of the histogram wherein the ordinate represents a frequency $h_{xi}$ and the abscissa represents a section $x_i$ of reflectance defined as follows:

$$x_i = \{2 \cdot i, \ 2 \cdot (i+1)\}, \ i = 0\text{--}127.$$

where a representative value of a section is $2 \cdot i$. In other words, measured reflectance data are grouped for each two data in order to remove spurious scattering of data and there are 128 sections for the 256 levels. A first region wherein characters may exist and a second one wherein the ground may exist are defined previously for regions from 0 to $x_f$ (f<b) and from $x_b$ to $x_{127}$, respectively. A characteristic quantity on ground or the ground frequency $h_{pw}$ denotes a sum of frequencies of gradation levels in a first or high window 6 around the ground peak $x_p$, as shown in FIG. 4 which is an enlarged view of part of FIG. 2

$$h_{pw} = \sum_{i=p-pw/2}^{p+pw/2} h_{xi},$$

where pw denotes a value of the width of the window 6. The value pw is a fixed value in this example. On the other hand, a characteristic quantity on characters or the character frequency $h_{fw}$ denotes a sum of frequencies of gradation levels in a third or low window 8 from $x_o$ to a level $x_f$ where characters or black images are expected to exist, as shown in FIG. 2.

$$h_{fw} = \sum_{i=0}^{f} h_{xi}.$$

Further, the background frequency $h_{bw}$ denotes a sum of frequencies of gradation levels in a second or intermediate window 10 (FIG. 4) from $x_d$ to $X_{d+bw}$ located below the first window 6 where a background is expected to exist.

$$h_{bw} = \sum_{i=d}^{d+bw} h_{xi}.$$

In the example shown in FIG. 4, $x_d$ is located below the ground peak $x_p$ by a predetermined constant distance D. The background frequency $h_{bw}$ intends to detect a background having information such as a color background different from the ground.

Then, the black-to-white ratio $R_{bw}$ and the magazine ratio $R_{mg}$ are defined as follows:

$R_{bw}=h_{fw}/(h_{pw}+h_{bw})$.

$R_{mg}=h_{bw}/h_{pw}$.

If the black-to-white ratio $R_{bw}$ is large, the document is decided to be a half-tone or photograph document. In this example, if the black-to-white ratio $R_{bw}$ is larger than a threshold value 35%, the document is decided to be a half-tone document, and the ground is not removed.

Figure 5:
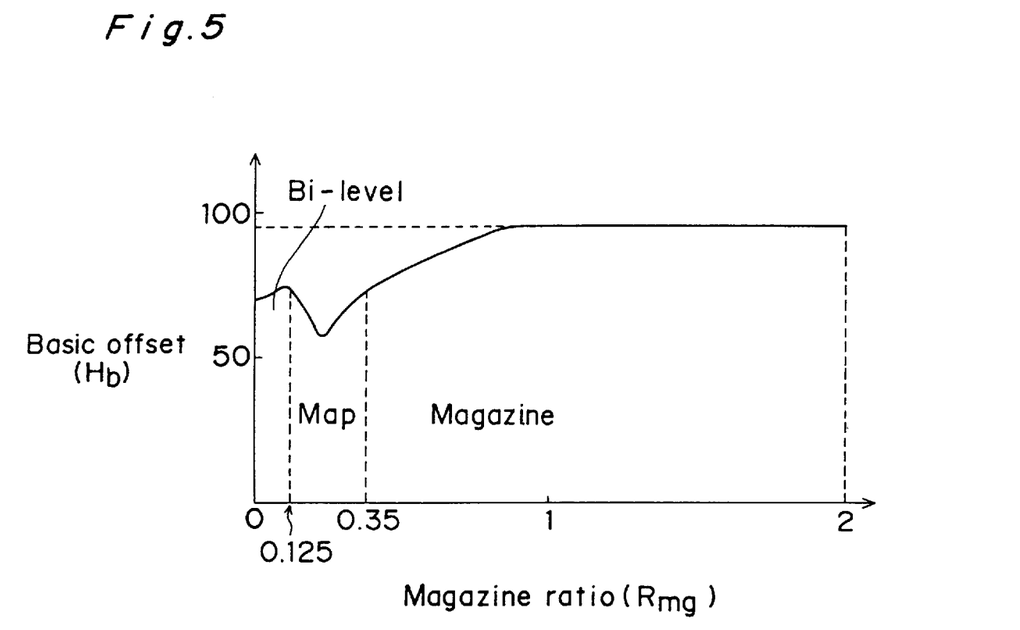
FIG. 5 is a graph of basic offset quantity $H_b$ as a function of magazine ratio $R_{mg}$.

For a document where the black-to-white ratio $R_{bw}$ is not larger than the threshold value 35%, a ground quantity $R_{th}$ is determined to remove the ground. The ground quantity $R_{th}$ is determined according to the ground peak $x_p$ and a basic offset quantity $H_b$, as shown in FIG. 2. The basic offset quantity $H_b$ is determined according to the magazine ratio $R_{mg}$ by a relation determined previously by considering this situation experimentally. FIG. 5 shows an example of a look-up table for determining the basic offset quantity $H_b$ according to the magazine ratio $R_{mg}$. If the magazine ratio $R_{mg}$ is small, this means that the background is small. Then, the basic offset quantity $H_b$ in a range from zero to 0.125 is determined for a bi-level document for which the ratio $R_{mg}$ is expected small. For a map document, the ratio $R_{mg}$ is small, but larger than a bi-level document. In the example shown in FIG. 5, a range from 0.125 to 0.35 is taken for a map document. Further, in a remaining range above 0.35, a magazine document is expected to exist. Thus, the basic offset quantity Hb is changed according to the magazine ratio $R_{mg}$, as shown in FIG. 5, by taking the background and the ground into account. The magazine ratio $R_{mg}$ is assigned for a bi-level document near zero, and the basic offset quantity $H_b$ is set to be as low as about 70. For the range assigned for a map document, it is set to be rather low at the center in the range. Further, for the range assigned for a magazine document where the background is large, the basic offset quantity $H_b$ is set to be about 95.

Figure 6:
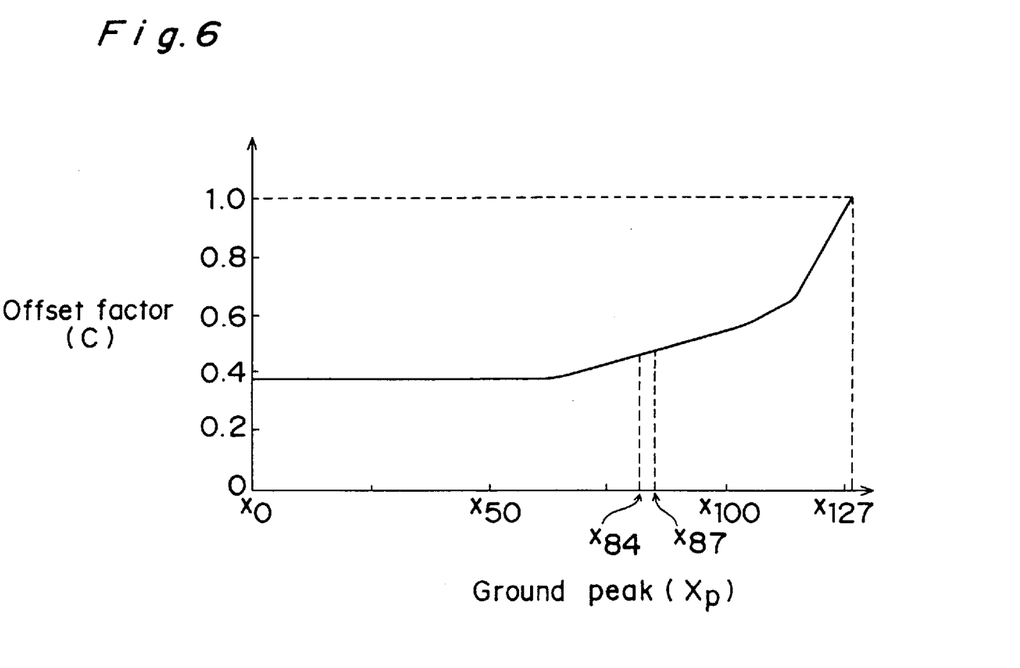
FIG. 6 is a graph on offset factor C as a function of ground peak $x_p$.

As shown in FIG. 6, the basic offset quantity $H_b$ determined as explained above is corrected according to the ground peak $x_p$. If the ground is removed by using only the offset quantity $H_b$, there is a tendency that the ground is removed always excessively. If the ground peak $x_p$ is not near the white level $x_{127}$, the document is not a bi-level document. A document would have more information near the ground peak $x_p$ with decreasing ground peak $x_p$. The offset factor C shown in FIG. 6 is determined by considering this situation experimentally, and an offset factor "C" shown in FIG. 6 is determined by referring to a look-up table. The offset quantity H is determined by multiplying the offset quantity $H_b$ with the offset factor C so as to reduce the degree of the removal of the ground.

As shown in FIG. 6, the offset factor C decreases from 1.0 at $x_{127}$ to 0.38 with decreasing ground peak $x_p$. Levels near the white level corresponds to a bi-level document. Then, lower levels adjacent to those for a bi-level document are provided for a map document. On the other hand, level $x_{84}$ corresponds to a newspaper document and level $x_{87}$ corresponds to a blue-print document which is not included in the above-mentioned five types.

Figure 7:
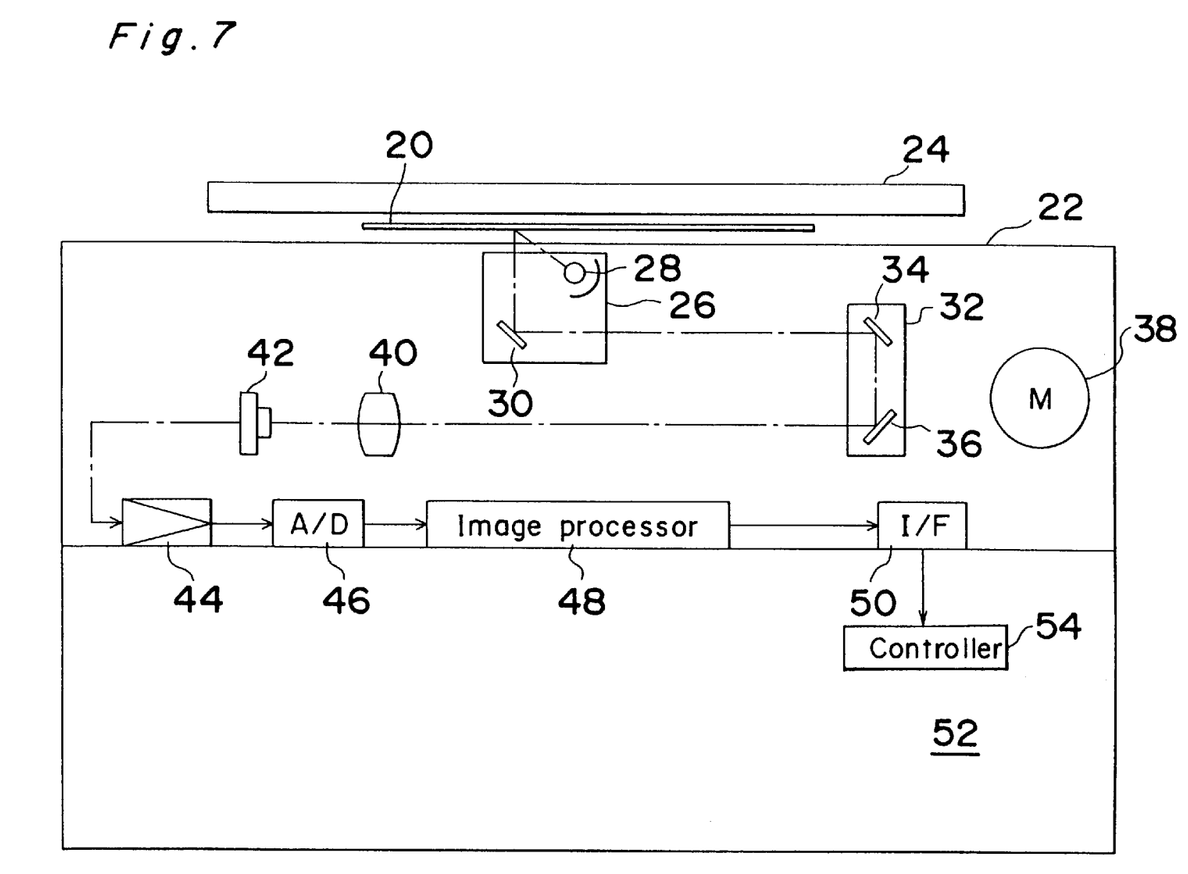
FIG. 7 is a diagrammatic view of a digital copying machine.

FIG. 7 shows a digital copying machine. In an image reader thereof, a document 20 is put on a platen 22 and it is covered by a cover 24. A first slider 26 carries a light source 28 and a first mirror 30, while a second slider 32 carries second and third mirrors 34, 36. The sliders 26 and 32 are driven by a motor 38. A light emitted from the light source 28 illuminates the document 20, and the light reflected from the document 20 is reflected by the mirrors 30, 34, 36 to enter a lens 40 to focus onto a light-receiving plane of a linear CCD image sensor 42. In a scan of the document 20, the sliders 26 and 32 are moved by the motor 38 in a subscan direction while pixels along a main scan direction in the CCD image sensor 42 are read. Horizontal synchronization signals are used as control signals along the main scan direction, while vertical synchronization signals are used as control signals along the subscan direction.

The image sensor 42 converts a light signal to an electric signal, which is amplified by an amplifier 44 and digitalized by an analog-to-digital converter 46 to provide digital data of 256 levels. The digital image signal is subjected to various processings by an image processor 48. The digital data are sent through an interface 50 to a controller 54 of an image forming apparatus, such as a digital printer 52, where the controller 54 modulates a laser beam according to the corrected image data to expose a photoconductor to print an image on a sheet of paper according to a known electrophotographic process.

Figure 8:
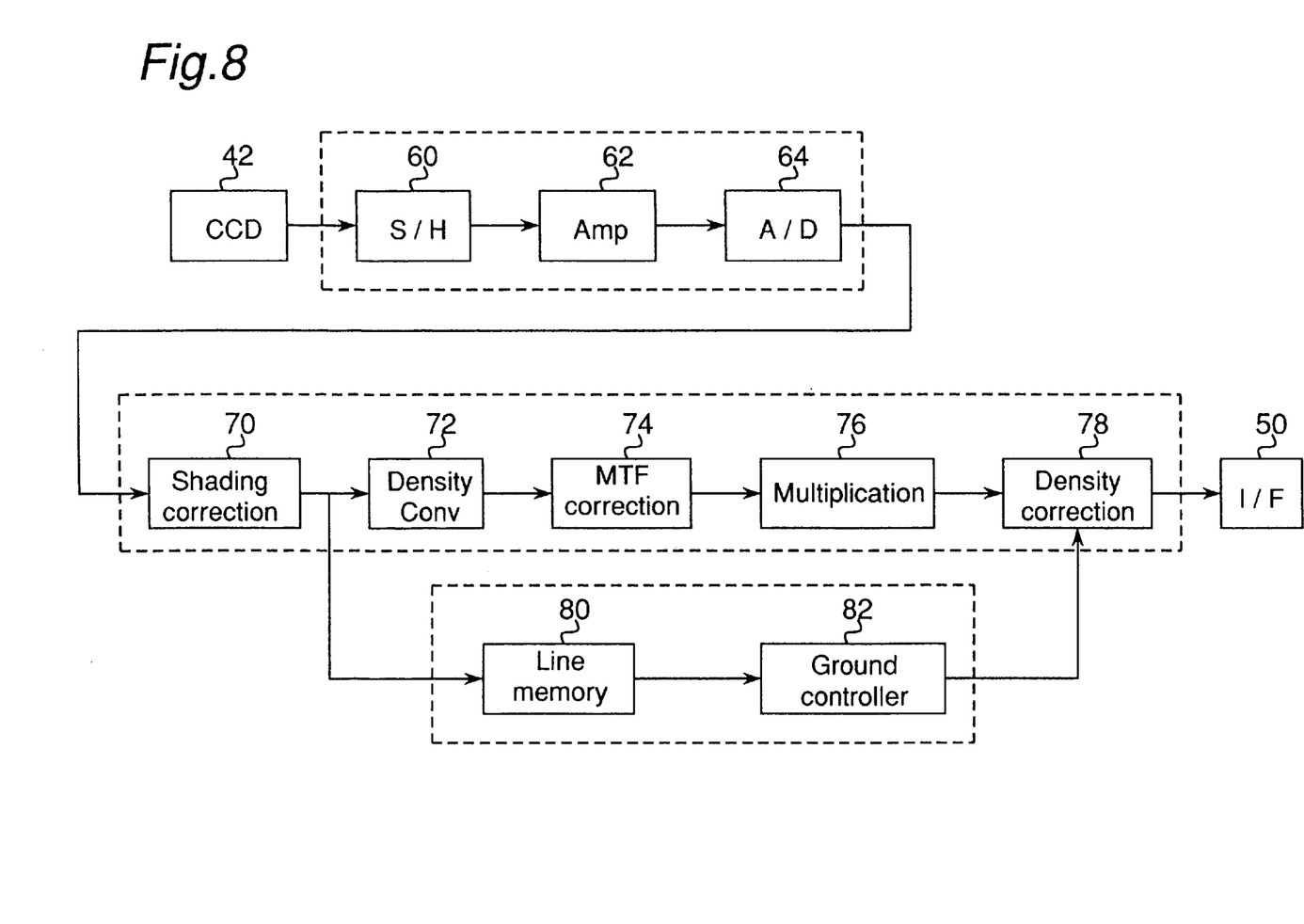
FIG. 8 is a block diagram of an image processor.

FIG. 8 shows a block diagram of the image processor 48. An image signal received from the CCD image sensor 42 is first subjected to an analog processing. That is, it is sampled and held by a sample-and-hold circuit 60, amplified by an amplifier 62 and converted to digital value by an analog-to-digital circuit 64. Then, the digital value of reflectance is subjected to a digital processing. The digital value is first corrected for scatterings due to sensitivity and the like by a shading correction circuit 70. Then, it is converted by a reflectance-to-density converter 72 to a density data in an appropriate density range. Then, the density data are subjected by an MTF correction circuit 74 to edge emphasis and smoothing in order to improve image quality appropriately for a character image and for a half-tone image. Then, the data are enlarged or reduced according to an amplification power by an amplification section 76. Finally, the data are corrected as to density by a density correction circuit 78, and the corrected data are sent through an interface 50 to the printer 52. The blocks 60–76 are known in a digital copying machine, while the density correction circuit 78 corrects the image data according to the ground as explained below.

The image data after shading correction are also stored in a line memory 80. The data in the line memory 80 are processed by a ground controller 82, which provides signals for ground control to the density correction circuit. The ground controller 82 has a central processing unit (not shown) and generates a histogram on the data stored in the line memory 82 to determine a ground quantity for each horizontal line, and the ground quantity is sent to the density correction circuit 78 in synchronization to a horizontal synchronization signal.

Figure 9:
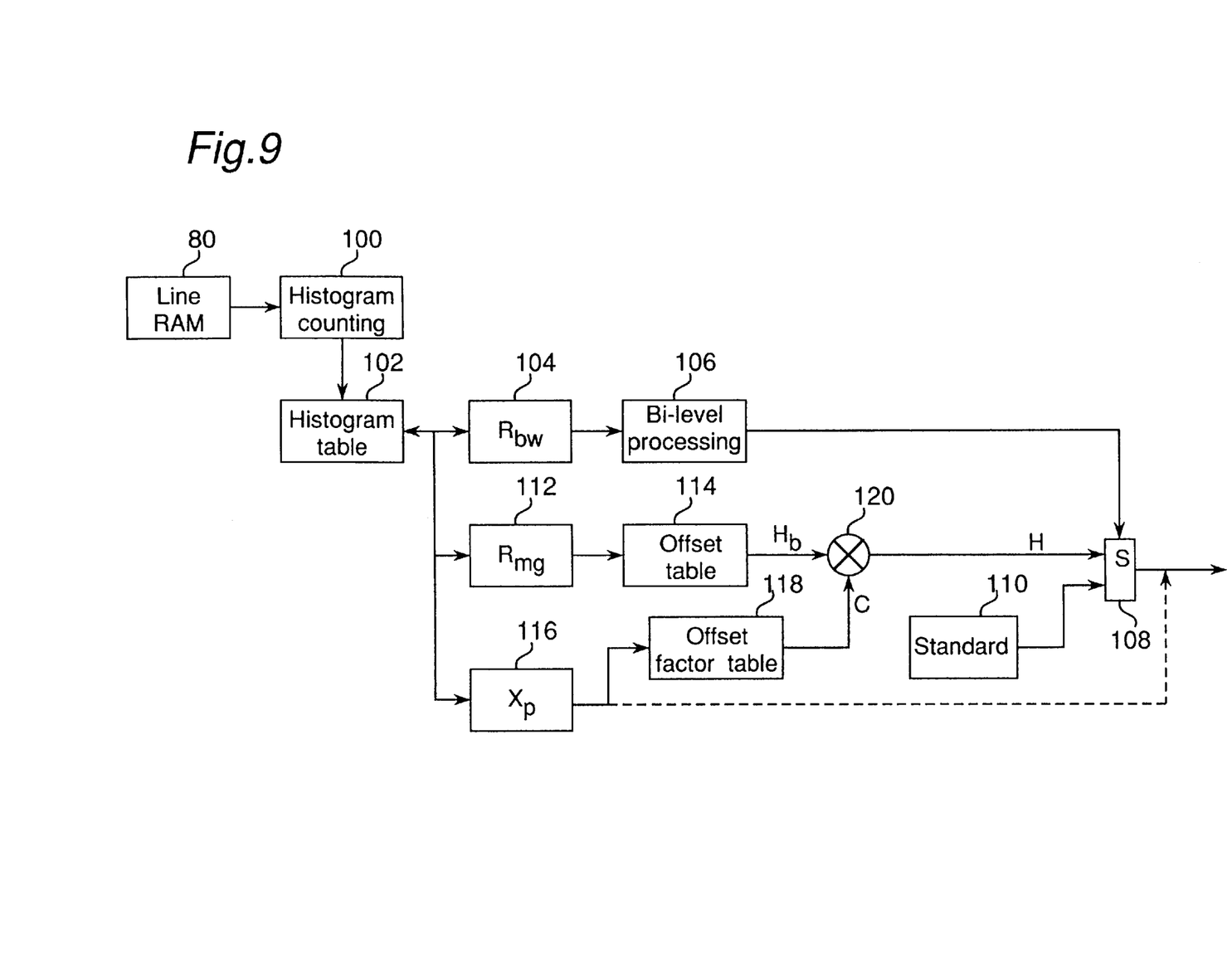
FIG. 9 is a block diagram of a ground controller.

FIG. 9 shows a block diagram of the ground controller 82. Most of the blocks in FIG. 9 are performed by the CPU (not shown) which controls the ground controller 82. First, a histogram generation block 100 having counters prepares a histogram from the image data of a line stored in the line memory 80 and sends the histogram data to a memory called a histogram table 102. Then, by using the histogram data stored in the histogram table 102, a black-to-white ratio section 104 calculates a black-to-white ratio $R_{bw}$, and if the ratio $R_{bw}$ is more than 35% or a threshold value, a bi-level section 106 sends a signal for a switch 108 to select a standard offset value 110 for data correction without ground control. If the black-to-white ratio $R_{bw}$ is 35% or less, a magazine ratio section 112 calculates a magazine ratio $R_{mg}$, and a look-up table called an offset table 114, as shown in FIG. 5, sends a basic offset quantity $H_b$ according to the ratio $R_{mg}$ by using the histogram stored in the histogram table 102. On the other hand, a peak value detection section 116 detects a ground peak $x_p$ from the histogram and a look-up table called an offset factor table 118, as shown in FIG. 6, sends an offset factor "C" according to the ground peak $x_p$. Then, a multiplier 120 multiplies the corrected basic offset quantity and the offset factor and sends the product to the switch 108. If the black-to-white ratio is less than the threshold value of say 35%, the product is supplied through the switch 108 to the density correction section 78.

Figure 10:
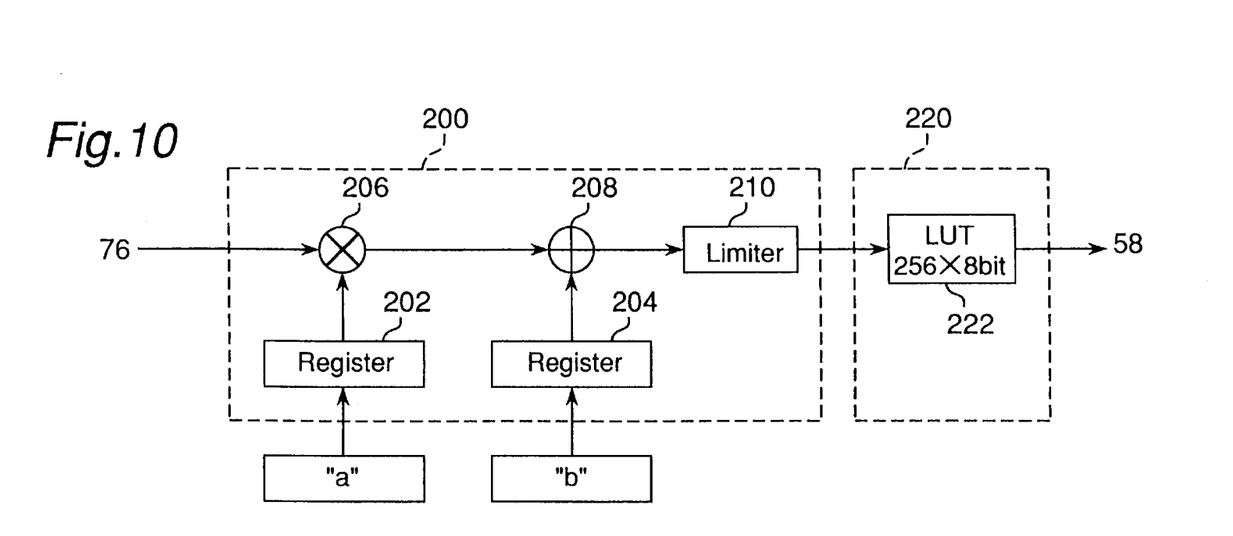
FIG. 10 is a block diagram of a density correction circuit.

Next, the density correction by taking ground into account is explained. FIG. 10 shows a block diagram of an example of the density correction section 78. In a linear transformation section 200, density data converted from reflectance data by the density converter 72 are received, and input image density data X are converted linearly to an output value Y', as shown in the left-side of FIG. 11, where the ground in the density data exists near the origin.

$$Y'=a \cdot X+b,$$

where b<0. The gradient "a" and the cross point "b" are stored in registers 202 and 204 by the CPU in the ground controller 82, respectively. Input image data X are multiplied by a multiplier 206 with the gradient "a" stored in the register 202, and the cross point "b" is added by an adder 208 to the product. Then, the sum is limited by a limiter 210 for limiting Y' within 256 level.

Figure 11:
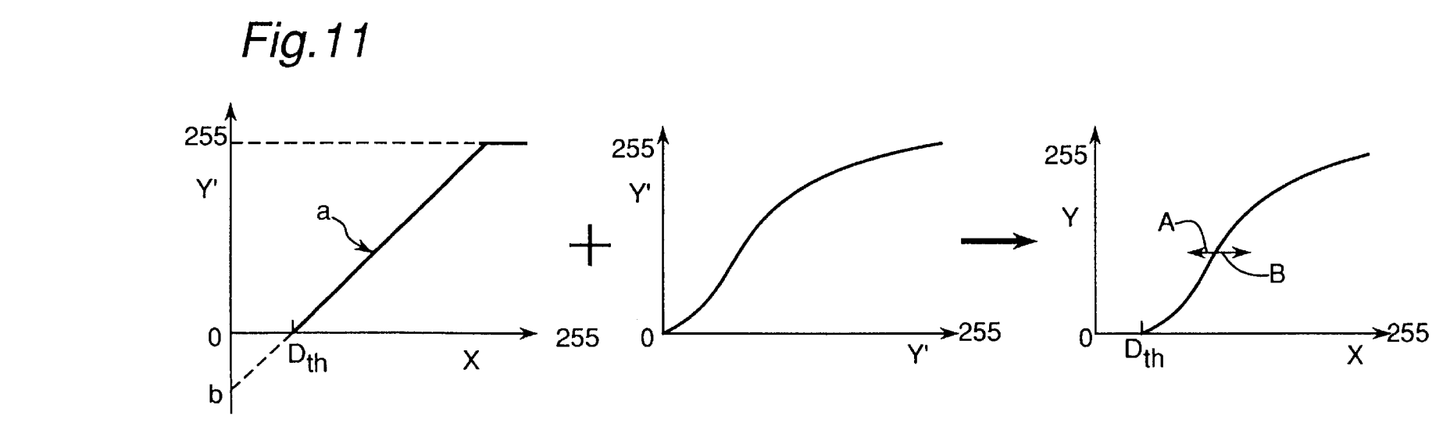
FIG. 11 is a diagram on density correction.

The value limited by the limiter 210 is supplied to a look-up table 222 of 256*8 bits in a nonlinear transformation section 220 for nonlinear transformation. That is, the output value Y' is converted nonlinearly for gamma correction by the look-up table 222 as shown in FIG. 11. A function for nonlinear transformation in the look-up table 222 is denoted as f(Y'), where $$Y=f(0), \text{ if } a \cdot X+b<0,$$

$$Y=f(a \cdot X+b), \text{ if } 0 \leq a \cdot X+b \leq 255,$$

and $$Y=f(255), \text{ if } 255<a \cdot X+b.$$

As shown in FIG. 11, an output signal Y shown in FIG. 11 is generated according to a density data X.

If $$a=1$$

and $$f(x)=0 \ (x=0)$$

or $$f(x)>0, \ (x \neq 0),$$

a following relation holds between a ground quantity $D_{th}$ and the cross point b:

$$1 \cdot D_{th}+b=0.$$

$$b=-D_{th}.$$

Therefore, the ground quantity $D_{th}$ can be set only by changing the cross point b by the ground controller 82, without changing the look-up table 222. If the ground quantity $D_{th}$ is controlled to be decreased or increased, the ground appears or disappears as shown by an arrow "A" or "B" shown in FIG. 11.

Figure 12:
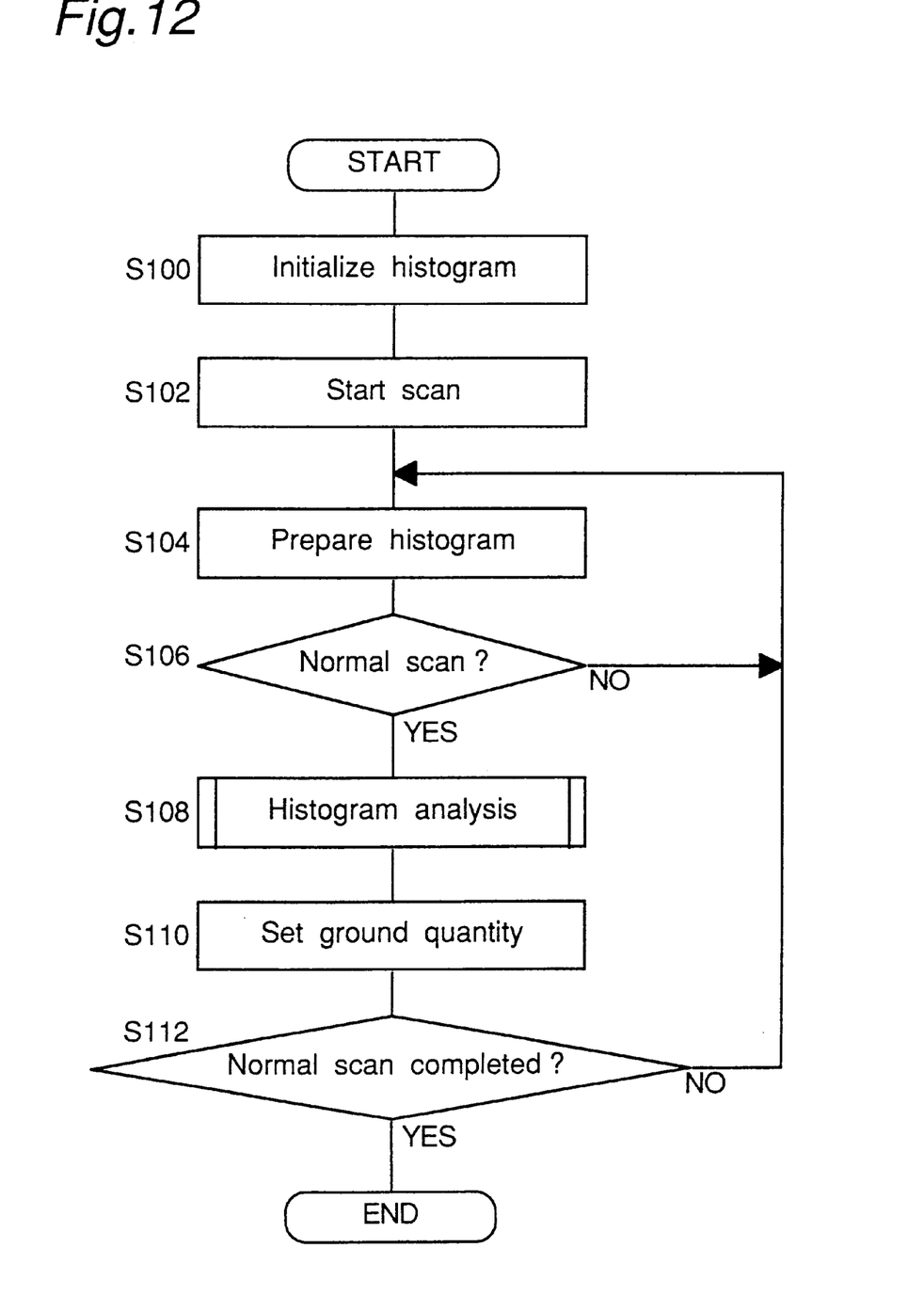
FIG. 12 is a main flowchart of ground control.

FIG. 12 shows a flow of automatic ground control by the CPU in the ground controller 82. First, a histogram is initialized (step S100). Next, a scan is started (step S102). Then, image data of a line is stored in the line memory 80, and a histogram of measured image data is prepared by counting frequencies at a constant sampling time period for each line or for every few lines by referring to the line memory 80, and the histogram is stored in the histogram table 102 (step S104). These steps correspond to blocks 100 and 102 in FIG. 9. Then, if it is decided that the scan is not a normal scan or it is a prescan (NO at step S106), the flow returns to step S104, so as to perform a normal scan. A document is scanned preliminarily first as to an area from an end point of the document to a point 50 mm therefrom vertically. This prescan is performed in order to prevent a large change in histogram when a normal scan of the document is started. In a normal scan (YES at step S106), the flow proceeds to step S108 for processing the measured data. In a normal scan for printing, a line in the whole plane of the document is scanned for each line or for every few lines.

In the processing of the measured data, the histogram is analyzed (step S108) where a ground quantity H is calculated, and the ground quantity H is supplied to the density correction section 78 (step S110). These processes correspond to blocks 104–120 in FIG. 9. Then, if it is decided that the scan is not completed (NO at step S112), the flow returns to step S104, to continue the normal scan, otherwise the flow ends.

Figure 13:
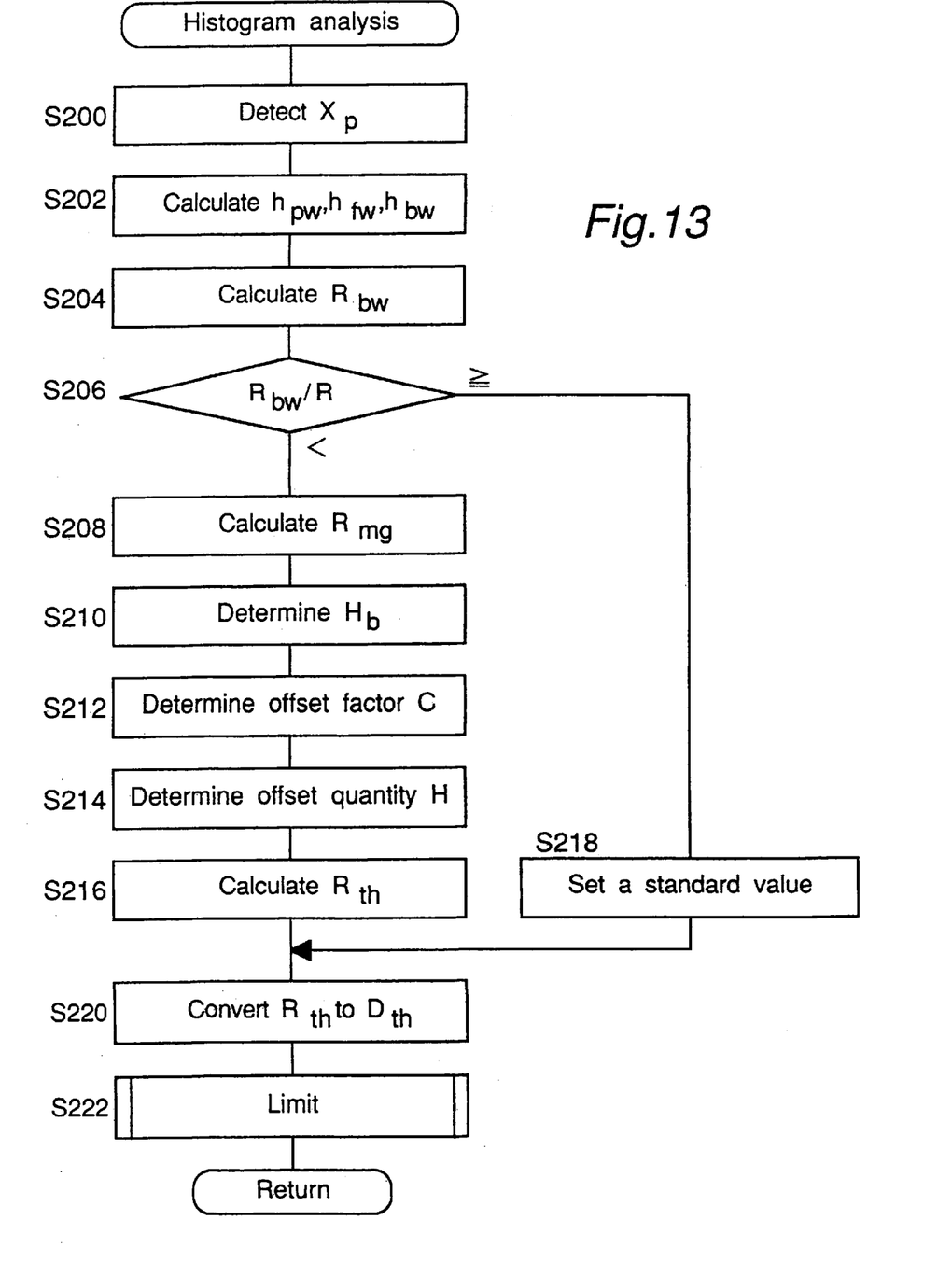
FIG. 13 is a flowchart of the histogram analysis.

FIG. 13 shows a flow of the histogram analysis at step S108. In order to analyze the histogram, a ground peak $x_p$ is first detected (step S200). It is obtained by searching a section having the largest frequency in the second region. If there is a plurality of second regions for determining the largest frequency, the one thereof having the smallest representative value or the smallest reflectance is selected in order to remove the ground. Then, the character frequency $h_{pw}$, the ground frequency $h_{fw}$ and the background frequency $h_{bw}$ are calculated (step S202) Then, the black-to-white ratio $R_{bw}$ is calculated (step S204), and the ratio $R_{bw}$ is compared with a threshold value or 35% (step S206).

If the ratio $R_{bw}$ is smaller than the threshold value or the document is not a half-tone document, the magazine ratio $R_{mg}$ is calculated (step S208) and a basic offset quantity $H_b$ is determined by referring to the offset table 114 (step S210), while the offset factor C is determined from the ground peak $x_p$ by referring to the offset factor table 118 (step S212). Then, the offset quantity H is calculated as the basic offset quantity times the offset factor (step S214). Finally, an offset quantity H is subtracted from the ground peak $x_p$ to determine the lower limit of the ground range $x_r = x_p - H$, and the ground quantity $R_{th}$ in reflectance scale is determined as follows:

$$R_{th} = x_{127} - x_r = (x_{127} - x_p) + H.$$

On the other hand, if the ratio $R_{bw}$ is equal to or larger than the threshold value or the document is a half-tone document, a standard value of $R_{th}$ is set (step S218) so as to prevent ground correction for a half-tone document. The standard value corresponds to a value which is set when a central density is selected in manual exposure mode in the digital copying machine.

Then, the ground quantity $R_{th}$ is changed from a value in the reflectance scale to the ground quantity $D_{th}$ in the density scale to be used in the density correction circuit 78 (step S220). Then, a change of the ground quantity $D_{th}$ of this line to that of a previous line is limited if necessary (step S222, refer FIG. 14).

Figure 14:
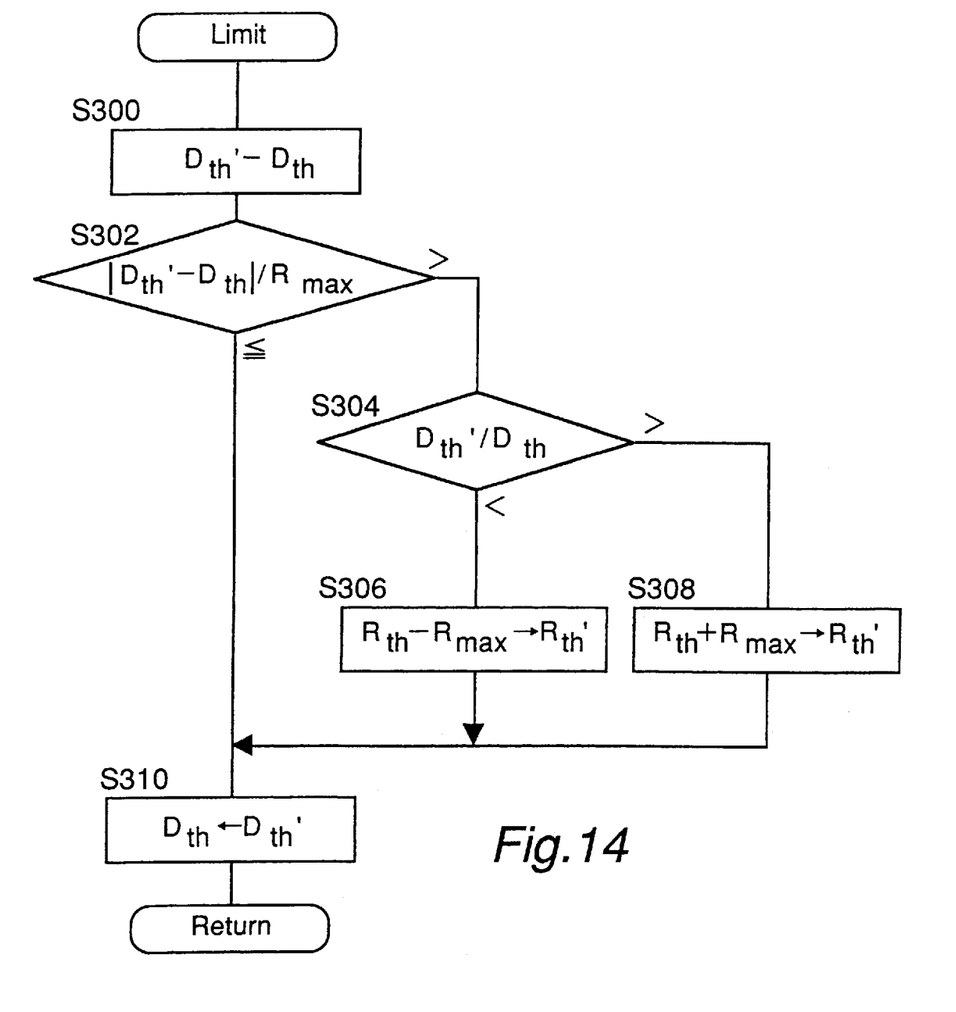
FIG. 14 is a flowchart of limiting ground quantity.

FIG. 14 shows a flow of limiting a change in the ground quantity $D_{th}$. First, a change in the ground quantity $D_{th}$ of the present line from that of previous line is calculated (step S300). Then, an absolute value of the change in $D_{th}$ from $D_{th'}$ is compared with a threshold value or a maximum change $R_{max}$ (step S302). If the absolute value of the change is equal to or less than the maximum change $R_{max}$, the flow returns readily. On the contrary, if the absolute value of the change exceeds the maximum change $R_{max}$ (step S304), the ground quantity $R_{th'}$ is set as $R_{th} - R_{max}$ (step S306) if the ground quantity decreases or $D_{th'} < D_{th}$, while if the absolute value of the change is not larger than the maximum change $R_{max}$ the ground quantity $R_{th'}$ is set as $R_{th} + R_{max}$ (step S308) if the ground quantity increases or $D_{th'} < D_{th}$. Finally, the ground quantity $D_{th}$ in the present line is set as $D_{th'}$ for the processing of the next line (step S310).

In the above-mentioned embodiment, a histogram is prepared for each line or for every few lines. However, it is also possible to prepare a histogram for a region larger than a line. In this case, a memory having a capacity larger than the line memory 80 is provided instead of the line memory, and it stores reflectance data in the region. Then, a histogram on the region is prepared and the ground is processed in the unit of a region.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading apparatus comprising:
    an image reader which detects a light reflected from a document and sends gradation data on the reflected light as digital data for each pixel of an image of said document;
    a histogram generator for counting frequencies, at each gradation level of the digital data received from said image reader, to generate a histogram;
    a detector for detecting whether the image of said document is a bi-level image, a map image, or a magazine image according to the frequencies in the thus generated histogram; and
    a data converter for converting said gradation data according to a detecting result of said detector.

2. An image reading apparatus according to claim 1, wherein said detector extracts a gradation level having a largest frequency in the histogram generated by said histogram generator to set a resulting extracted gradation level as a ground reference value, and sets a ground range according to the ground reference value by using a prescribed relation.

3. An image reading apparatus according to claim 1, wherein said detector extracts a feature of the document image from the histogram and detects the image of said document as a bi-level image, a map image, or a magazine image according to the extracted feature.

4. An image reading apparatus according to claim 1, wherein said detector includes:
    a ground reference setting device for extracting a gradation level having a largest frequency in the histogram generated by said histogram generator to set a resulting extracted gradation level as a ground reference value,
    a first frequency extractor for defining a first window in the histogram as a window including the ground reference value and for adding frequencies at gradation levels in the first window to provide a sum of frequencies in the first window as a first frequency,
    a second frequency extractor for defining a second window in the histogram as a window existing below the first window in the histogram, but not including a lowest gradation level and for adding frequencies at gradation levels in the second window to provide a sum of frequencies in the second window as a second frequency, and
    a feature extractor for determining a ratio of the first frequency provided by said first frequency extractor to the second frequency provided by the second frequency extractor.

5. An image reading apparatus comprising:
    an image reader which detects light reflected from a document and sends gradation data on the reflected light as digital data for each pixel of an image of said document;
    a histogram generator for counting frequencies, at each gradation level of the digital data received from said image reader, to generate a histogram;
    a largest frequency extractor for extracting a gradation level having a largest frequency in the histogram generated by said histogram generator;
    a feature extractor for extracting a feature of the document image from the histogram generated by said histogram generator; and
    a data correcting device for correcting the gradation data, provided by said image reader, according to the thus extracted feature and to the gradation level having the largest frequency.

6. An image processing method comprising the steps of:

detecting a light reflected from a document;

sending gradation data on the reflected light as digital data for each pixel of an image of said document;

counting frequencies at each gradation level of the thus sent digital data to generate a histogram;

selecting an attribute of the image on said document from a bi-level image, a map image, and a magazine image according to the thus counted frequencies; and converting said gradation data, provided by said step of detecting, according to the selected attribute.

7. An image processing method comprising the steps of:

detecting a light reflected from a document;

sending gradation data on the reflected light as digital data for each pixel of an image of said document;

counting frequencies at each gradation level of the thus sent digital data to generate a histogram;

extracting a gradation level having a largest frequency in the histogram;

extracting a feature of the document image from the histogram; and correcting the gradation data, provided by said step of detecting, according to the gradation level having the largest frequency and the thus extracted feature of the document image.

* * * * *